(12) United States Patent
Muller et al.

(10) Patent No.: US 7,005,582 B2
(45) Date of Patent: Feb. 28, 2006

(54) CABLE CLOSURE

(75) Inventors: Thorsten Muller, Menden (DE); Jean-Louis Delatouche, Chateauneuf en Thymerais (FR); Yannick Schreiber, Chartres (FR); Alberto Rodrigues, Herblay (FR)

(73) Assignee: CCS Technology, Inc., Wilmington, DE (US)

( * ) Notice: Subject to any disclaimer, the term of this patent is extended or adjusted under 35 U.S.C. 154(b) by 102 days.

(21) Appl. No.: 10/482,186

(22) PCT Filed: Jun. 20, 2002

(86) PCT No.: PCT/EP02/07394

§ 371 (c)(1),
(2), (4) Date: Jun. 14, 2004

(87) PCT Pub. No.: WO03/003534

PCT Pub. Date: Jan. 9, 2003

(65) Prior Publication Data

US 2004/0231881 A1  Nov. 25, 2004

(30) Foreign Application Priority Data

Jun. 29, 2001 (FR) .................................. 01 08598
Jun. 29, 2001 (FR) .................................. 01 08601

(51) Int. Cl.
H02G 15/02 (2006.01)

(52) U.S. Cl. ...................................... 174/77 R; 174/93

(58) Field of Classification Search ................ 174/93, 174/77 R, 65 SS, 65 G; 292/256.67, 256.71, 292/256.73; 439/352
See application file for complete search history.

(56) References Cited

U.S. PATENT DOCUMENTS

| | | | | |
|---|---|---|---|---|
| 1,745,941 A | * | 2/1930 | Metcalf, Jr. ................... | 285/208 |
| 2,639,313 A | * | 5/1953 | Street, Jr. ................ | 174/152 R |
| 2,688,651 A | * | 9/1954 | Blake ............................ | 174/93 |
| 3,055,972 A | * | 9/1962 | Peterson ...................... | 174/151 |
| 3,885,851 A | * | 5/1975 | Bennett ....................... | 439/352 |
| 4,116,472 A | * | 9/1978 | Schmitt .......................... | 285/4 |
| 4,860,838 A | * | 8/1989 | Asak ............................ | 175/320 |
| 5,432,301 A | * | 7/1995 | Gehring ......................... | 174/78 |
| 5,949,022 A | * | 9/1999 | Park et al. ................. | 174/77 R |
| 6,511,099 B1 | * | 1/2003 | Bartholoma et al. ...... | 285/140.1 |

\* cited by examiner

Primary Examiner—Chau N. Nguyen
(74) Attorney, Agent, or Firm—Christopher C. Dremann

(57) ABSTRACT

A splice protection sleeve flange includes means for clamping a cable, a seal interposed between two rings, one of which can move along the cable, and a frustoconical threaded part which is screwed into the flange and acts both on the moveable ring and on the clamping means. In another aspect, a device for clamping a cable includes a ring on which fingers are each mounted in the form of a hinge, the free end of each finger terminating in a claw turned inwardly towards the axis YY' of the ring and, on the side of the plane where the fingers do not lie, there is provided a means which, by shape complementarity, is intended to cooperate with another clamping device of the same shape but having a ring diameter greater or smaller than a value equal to the largest radial dimension of the fingers.

6 Claims, 4 Drawing Sheets

US 7,005,582 B2

CABLE CLOSURE

CROSS REFERENCE TO RELATED APPLICATIONS

This application is a United States national application claiming priority to International Application No. PCT/EP02/07394, filed on Jun. 20, 2002, which claims priority to French Patent Application No. 01/08598, filed Jun. 29, 2001, and French Patent Application No. 01/08601, filed Jun. 29, 2001.

FIELD OF THE INVENTION

The present invention relates to cable closures, especially to splice protection sleeves as part of cable closures used in the telecommunications field for the purpose of protecting a cable, especially a power cable or a telephone cable such as a fibre-optic cable. Furthermore, the present invention relates to devices as part of cable closures for clamping a cable, especially a power cable or a telephone cable, such as a fibre-optic cable.

BACKGROUND OF THE INVENTION

Federal Republic of Germany Patent Application No. 19958112.6 discloses a splice protection sleeve comprising a shell closed by two flanges. Each flange defines a passage for a cable. The flange includes means for mechanically clamping the cable. These means are intended to be positioned around the cable once the latter has been placed in the passage and to clamp it. Independently of these clamping means, there is provided a seal interposed between two rings into which the cable is slipped. At least one of the rings can move along the cable and is displaced by means of a slide. This ensures both mechanical clamping of the cable and sealing of the splice protection sleeve.

However, this is achieved only by putting up with a lengthy fitting operation to be carried out since it is necessary, on the one hand, to put the clamping means in place and, on the other hand, to clamp the seal between the two rings.

The subject of the invention is a quick-fit splice protection sleeve.

According to the invention, the slide is a frustoconical threaded part which is screwed into the flange by being slipped into the passage via its larger transverse surface and pushing back, as it is being screwed in, directly or via the clamping means, the moveable ring towards the other ring and tightening the clamping means around the cable.

Thereafter, the clamping means are put into action and the seal is deformed between the two rings by one and the same movement of the frustoconical threaded part. There is no longer, as previously, the need to carry out two successive operations for this purpose. When the frustoconical threaded part starts to move, it pushes the moveable ring back towards the other ring, which is preferably immobilized in the flange, and then when the moveable ring is moved over a certain distance it comes into abutment, while the threaded part continues to move, tightening the clamping means around the cable, thereby ensuring that the cable is mechanically clamped.

Furthermore, the present invention relates to clamping devices. Clamping devices of this kind which are suitable for each cable diameter are already known. When on site it is necessary to go from a small-diameter cable to a larger-diameter cable, a new clamping device suitable for the new diameter has to be provided.

The invention remedies this drawback by means of a device which allows most of the same clamping device to be maintained when going from a small-diameter cable to a larger-diameter cable.

According to another aspect of the present invention, the device for clamping a cable comprises a ring on which fingers lying approximately perpendicular to the plane of the ring are each mounted in the form of a hinge on the same side of this plane. The free end of each finger terminates in a claw turned towards the axis. On the side of the plane where the fingers do not lie, there is provided a means which, by shape complementarity, is intended to cooperate with another clamping device of the same shape but having a ring diameter greater or smaller than a value equal to the largest radial dimension of the fingers.

When it is necessary to go from a small-diameter cable to a larger-diameter cable, all that is required is to remove the clamping device of the same shape but of smaller ring diameter which, by shape complementarity, cooperated with the clamping device of larger diameter that was left in place in order immediately to obtain a clamping device suitable for the larger-diameter cable.

During mounting, the fingers are pushed back inwards, that is to say towards the axis, especially by a nut, until the claws of the fingers penetrate the cable and thus immobilize it, without any possibility of the cable moving longitudinally, or of rotating either. To make it easier for the nut or other element to act by pressing on the fingers, that portion of a finger axially furthest away from the ring is bevelled, the top of the bevel being closer to the axis than the rest of the bevel. The nut thus comes into contact with the finger along an inclined surface which means that the finger is pushed back towards the axis as the nut advances.

BRIEF DESCRIPTION OF THE DRAWINGS

In the appended drawings, given solely by way of example.

DETAILED DESCRIPTION OF THE INVENTION

Figure 1:
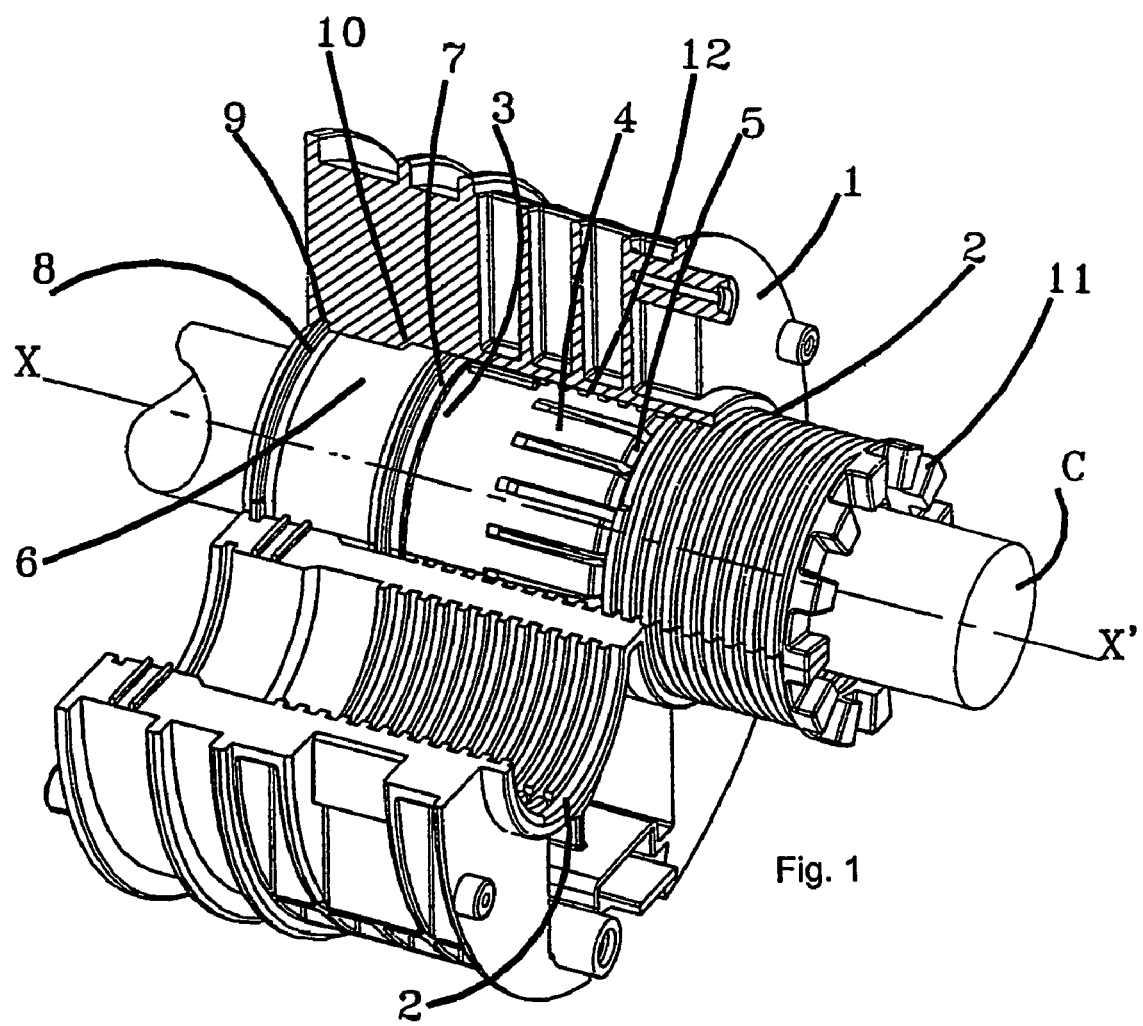
FIG. 1 is a view with a cutaway of a splice protection sleeve flange according to the invention before the moveable ring has been displaced by the threaded slide.

The splice protection sleeve flange shown in FIG. 1 comprises a flange body 1 defining two passages 2 for a cable C. The flange includes, as means for mechanically clamping the cable C, an annulus 3 extended by bars 4 uniformly spaced around the perimeter. These bars are resilient and each of them terminates in a claw 5 facing inwards and intended, when the bar is pushed back towards the axis XX' of the passage, to penetrate the cable C and mechanically clamp it properly.

Figure 2:
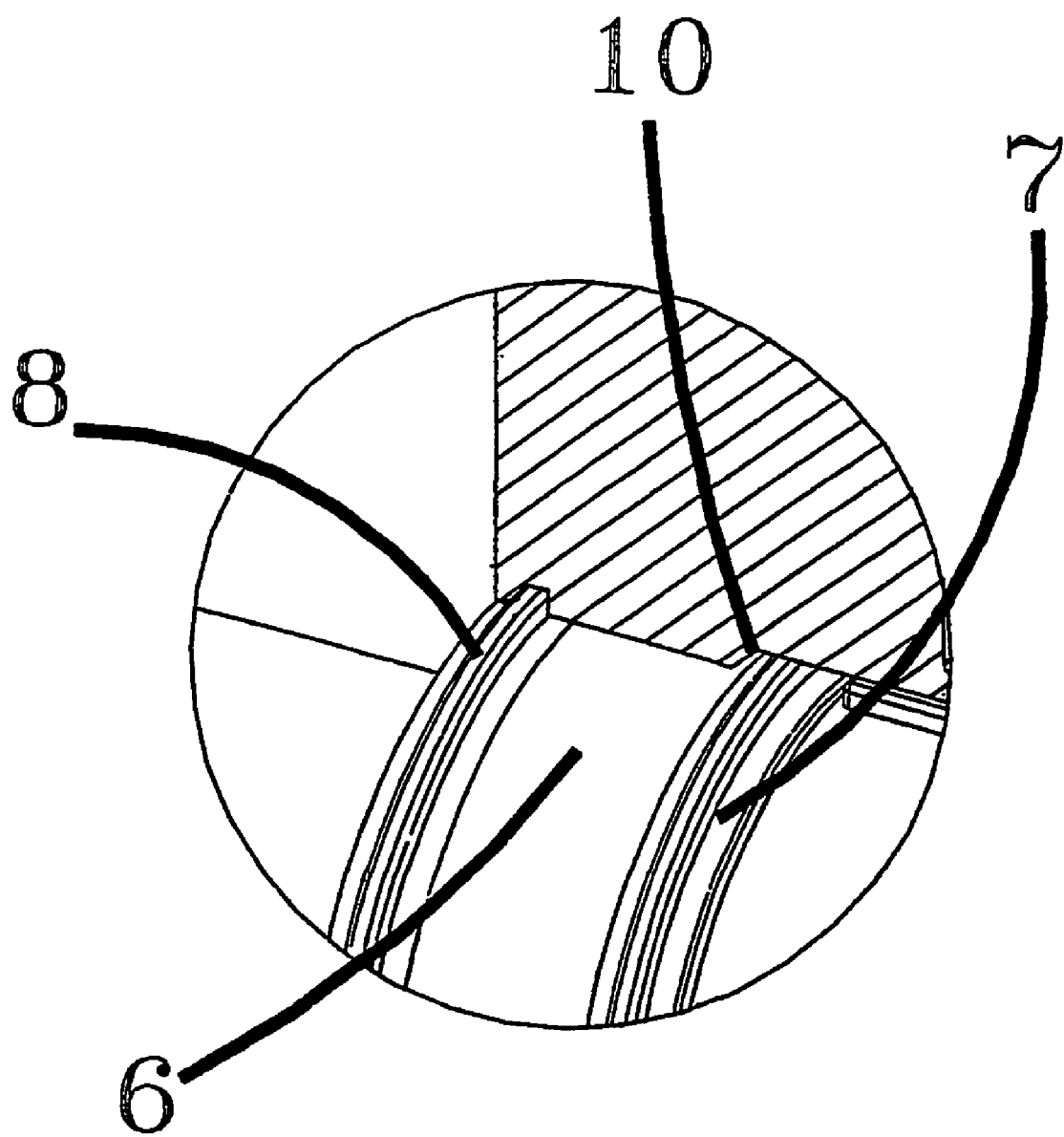
FIG. 2 is a view of a detail in FIG. 1, when the moveable ring has reached the end-of-travel position.

Further inside the sleeve, a seal 6, for example made of an elastomer or of what is called a gel, is interposed between a moveable ring 7 and a fixed ring 8. The ring 8 is immobilized by penetrating a groove 9 made on the inner face of the body 1. The cable C is slipped between the two rings 7, 8. The ring 7 can move along the axis XX' as far as a stop 10 (FIG. 2) made on the body 1.

A frustoconical threaded slide 11 is screwed into a tapping 12 in the body when it is slipped into the passage 2 via its larger transverse surface. The slide 11 is threaded into the body 1 and abuts the claws 5 of the bars 4. As it is being gradually screwed in, the slide 11 pushes back the annulus 3, which, in contact with the moveable ring 7, also pushes it back towards the fixed ring 8 until this moveable ring 7 butts against the stop 10. At this moment, the seal 6 highly compressed between the two rings 7 and 8 has flowed and ensures good sealing. When the slide 11 continues to be screwed in, it pushes the bars 4 inwards, these then catching on the cable C via the claws 5 and holding it properly in place.

Figure 3:
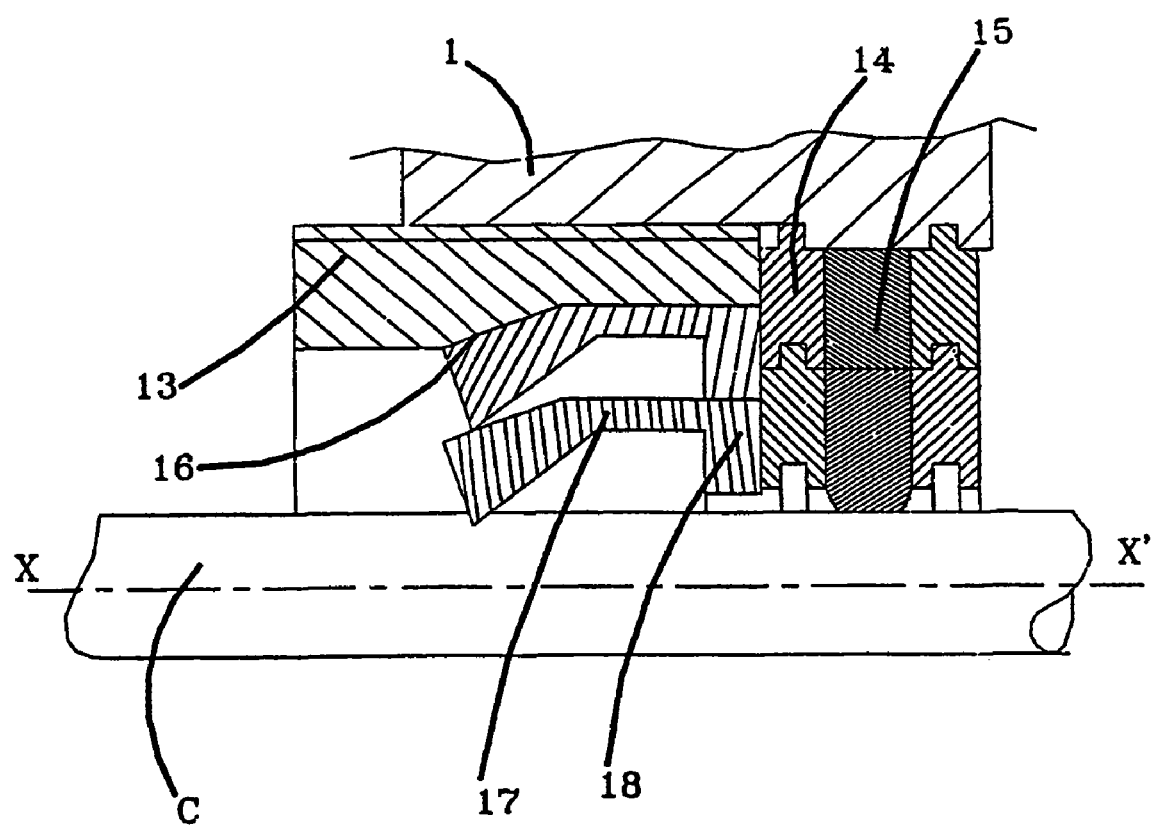
FIG. 3 is a sectional view illustrating a variant.

In FIG. 3, the slide 13 comes directly into contact with the moveable ring 14 which is itself in contact with the seal 15. At the start of the movement, the slide 13 compresses the seal 15 between the moveable ring 14 and the other, fixed ring and, at the same time, the slide 13 acts, via a ramp 16, on the bars 17 of an annulus 18 for clamping the cable C.

Figure 4:
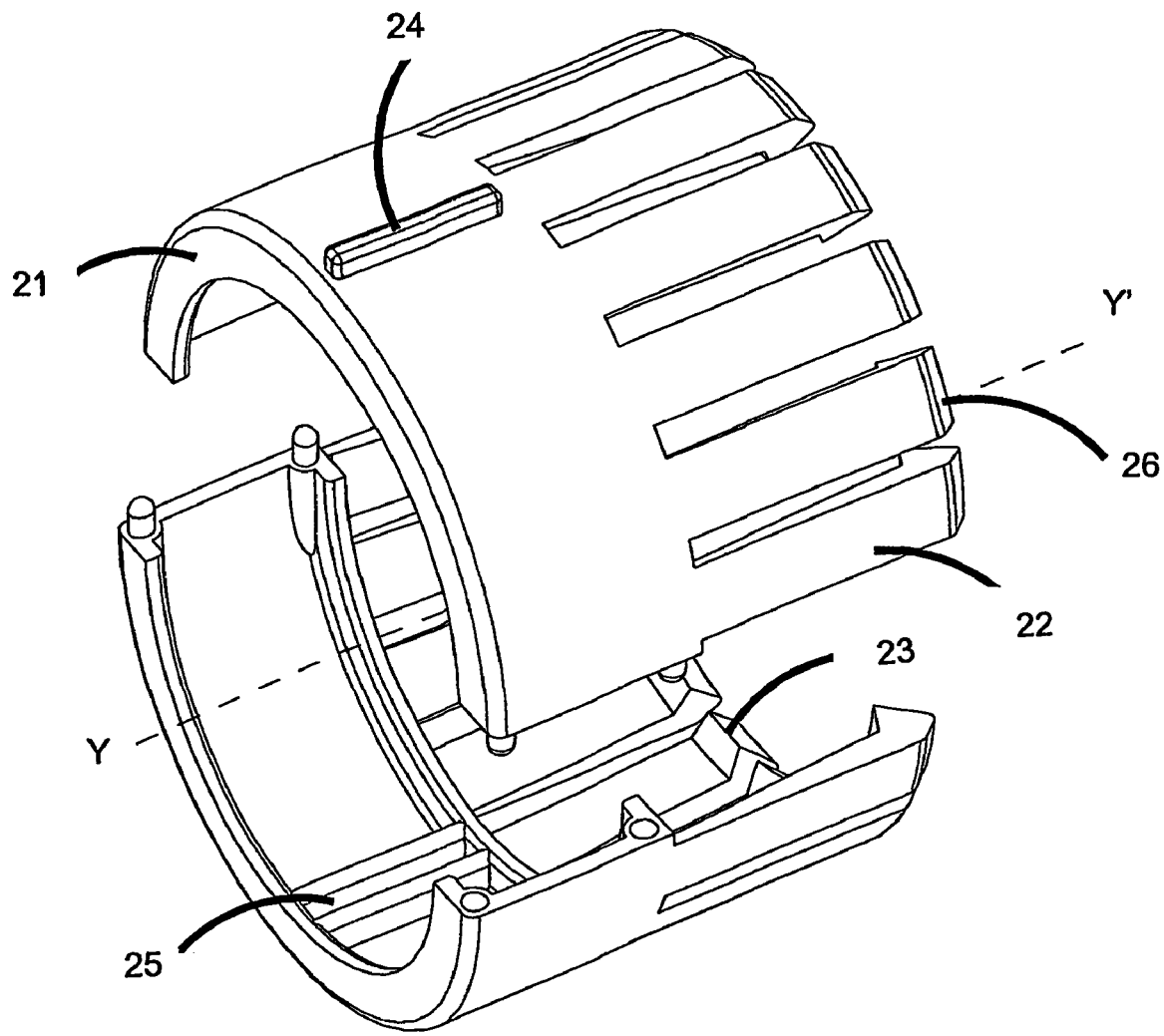
FIG. 4 is an exploded perspective view of a clamping device according to the invention.

The device shown in the FIG. 4 comprises a plastic ring 21 on which fingers 22, also made of plastic, are each mounted in the form of soft hinge. The free end of each finger 22 terminates in a claw 23 turned towards the axis YY' of the ring. On the side of the plane where the fingers 22 do not lie, there is provided, on the outer face of the ring, a rib 24 intended to cooperate, by shape complementarity, with a groove 25 of another ring having a diameter greater than that of the ring 21.

Each claw 22 has a bevel 26, the angle of the bevel being such that the end of the finger is approaching the axis YY'.

Of course, conversely it would be possible to provide a groove instead of the rib 24 and a rib instead of the groove 25.

The invention claimed is:

1. Splice protection sleeve comprising a flange defining a passage for a cable, the flange including means for clamping the cable, which means are intended to be positioned around the cable placed in the passage and to clamp it, and a seal interposed between two rings into which the cable is slipped and at least one of which can move along the cable and is displaced by means of a slide, wherein the slide is a frustoconical threaded part which is screwed into the flange by being slipped into the passage via its larger transverse surface and while being screwed in pushes the moveable ring towards the other ring and tightens the clamping means around the cable.

2. Sleeve according to claim 1, wherein the other ring is immobilized in the flange.

3. Sleeve according to claim 1, wherein the moveable ring is immobilized at the end of travel by a stop.

4. A splice protection sleeve flange defining a passage for a cable, the flange comprising:
   a clamp for clamping the cable relative to the flange, the clamp being positioned around the cable and within the passage;
   a pair of rings positioned around the cable and within the passage, at least one of the rings being movable along the cable;
   a seal interposed between the two rings and positioned around the cable; and
   a frustoconical slide configured to be inserted into the passage;
   wherein the slide displaces the moveable ring towards the other ring and tightens the clamp around the cable as the slide is inserted into the passage; and
   wherein the clamp comprises an annulus and a plurality of resilient bars extending from the annulus, each bar terminating in an inwardly facing claw that grips the cable when the slide is inserted into the passage and engages the clamp.

5. The flange according to claim 4 wherein the slide engages the moveable ring and the clamp when the slide is inserted into the passage.

6. A splice protection sleeve flange defining a passage for a cable, the flange comprising:
   a clamp for clamping the cable relative to the flange, the clamp being positioned around the cable and within the passage;
   a pair of rings positioned around the cable and within the passage, at least one of the rings being movable along the cable;
   a seal interposed between the two rings and positioned around the cable; and
   a frustoconical slide configured to be inserted into the passage;
   wherein the slide displaces the moveable ring towards the other ring and tightens the clamp around the cable as the slide is inserted into the passage; and
   wherein the other ring is immobilized in the flange and the moveable ring is immobilized by a stop positioned within the passage when the slide is inserted into the passage.

* * * * *